Patented July 26, 1949

2,477,280

UNITED STATES PATENT OFFICE 2,477,280

PROCESS OF CURING RUBBERLIKE MATERIALS

Francis P. Baldwin, Pluckemin, N. J., assignor to Standard Oil Development Company, a corporation of Delaware No Drawing. Application February 8, 1944, Serial No. 521,563

16 Claims. (Cl. 260—94.7)

This invention relates to synthetic rubber, relates particularly to the curing of rubber-like polymers of isobutylene with a diolefin; and relates especially to means for reducing the tendency toward scorchiness during the processing of such polymers preparatory to curing by the use of quinoid type of curing materials.

It has been found possible to copolymerize isoolefins such as isobutylene with polyolefins such as butadiene at low temperatures by the use of a dissolved Friedel-Crafts type catalyst; to yield exceedingly valuable rubber-like copolymers which react with sulfur and with paraquinonedioxime in a curing reaction, which is in some ways analogous to the vulcanization of rubber. When so cured, these polymers yield exceedingly valuable rubber substitutes which are characterized by high tensile strength, high modulus and other very valuable physical properties. However, in the processing of these polymers difficulty is experienced due to the fact that they must be milled in order to incorporate into them the various compounding agents and the curing agent and the necessary elevation of temperature during the compounding to incorporate the curing agent, often results in a premature curing reaction, identified by the shop as "scorchiness," which seriously interferes with compounding, calendering, extruding and other processes, and exerts various other harmful effects during molding and curing.

The curing of this copolymer by the use of paraquinone dioxine is described in the co-pending application Serial No. 426,715, filed January 14, 1942, now Patent Number 2,393,321, in the name of J. P. Haworth.

The present invention provides a means for overcoming this scorchiness by the addition to the copolymer of substances which will yield acids, or the acids themselves, particularly suitable being such substances as lead benzoate and other lead and heavy metal salts which upon heating yield acidic effects, or both acidic effects and oxidizing effects. These materials are used as compounding agents and added to the polymer compound before the curing agent and sulfurization aid or accelerator are mixed in. The presence of the acidic body prevents a premature reaction between the polymer and the curing agent under the influence of the vulcanization aid or accelerator.

Thus the invention consists of a new composition of matter comprising broadly an isoolefindiolefin interpolymer and a curing agent, preferably paraquinone dioxime or its aryl esters; in admixture with a small proportion of lead benzoate or other lead or heavy metal salt or reasonably easy dissociable acidic compound which, by its presence, serves the purpose of avoiding scorchiness of the polymer while it is being processed. Other objects and details of the invention will be apparent from the following description:

The raw material to which the present invention is applied is a copolymer of an isoolefin with a polyolefin. The preferred isoolefin is isobutylene, but other isoolefins of 5, 6, 7 and 8 or more carbon atoms per molecule are also usable, particularly 2,methyl butene-1, 2,methyl pentene-1, and 2,methyl hexene-1, and the like. For the polyolefin substantially any of the polyolefins such as butadiene, isoprene, piperylene, dimethyl butadiene, myrcene, and the like having from four up to twelve or fourteen carbon atoms per molecule are useful. In the preparation of the polymer, the isoolefin is desirably present in major proportion with the polyolefin present in minor proportion, mixtures having from 70 parts to 99.5 parts of the isoolefin with 30 to 0.5 parts of the polyolefin being preferred. The olefinic mixture is advantageously cooled to temperatures within the range of about $-20°$ C. to $-100°$ C. or even lower, to $-165°$ C., the preferred range being between $-40°$ C. and $-103°$ C. The olefinic material may be cooled by a refrigerating jacket upon the reactor, utilizing such refrigerants as liquid ethylene, liquid ethane or liquid methane, or the like, either at reduced pressures or at superatmospheric pressures, according to the desired temperature.

Alternatively, internal refrigerants such as liquid ethylene or solid carbon dioxide or liquid ethane or even liquid methane may be used directly in admixture with the olefinic material, again reduced pressures or elevated pressures being used as desired.

The cold olefinic material is polymerized by the application thereto of a Friedel-Crafts catalyst. The catalyst is preferably a solid catalyst such as aluminum chloride in solution in a low-freezing, non-complex-forming solvent; but gaseous catalysts such as boron trifluoride or liquid catalysts such as titanium tetrachloride may also be used. In fact, any of the Friedel-Crafts catalysts disclosed by N. O. Calloway in his article on "The Friedel-Crafts synthesis" printed in the issue of "Chemical Reviews" published for the American Chemical Society at Baltimore in 1935 in Volume XVII, No. 3, the article beginning on page 327, the list being particularly well shown on page 375, are useable. These catalysts are preferably used in solution in a low-freezing, non-complex-forming solvent. For the solvent such substances as carbon disulfide or its homologues and analogues may be used, but preferably the lower alkyl mono- or polyhalides are used; any of the alkyl halides having freezing points below $0°$ C., being thereby "low-freezing," are useful and it is characteristic of the alkyl halides that they, like carbon disulfide, form no complexes with the Friedel-Crafts catalysts.

The polymerization reaction is conveniently conducted by spraying the liquid catalyst solution onto the surface of the cold, rapidly stirred olefinic material; or the catalyst may be injected as a rapid stream into a zone of high turbulence in the olefinic material; or other convenient means for obtaining rapid dispersion of the catalyst solution into the olefinic mixture may be used.

The polymerization reaction proceeds rapidly to yield a solid polymer and the reaction may be continued until from 60% to 90% of the olefinic material present is polymerized. When the reaction has reached the desired stage, the solid polymer is desirably separated from residual portions of the polymerization mixture and brought up to room temperature. A convenient method of accomplishing this is to dump the contents of the reactor into warm water, or into warm alkaline solution, or into warm alcohol solution, or the like.

The resulting polymer may then be washed on the mill, if desired or otherwise purified. The resulting polymer may have a molecular weight (as determined by the Staudinger viscosity method) of from 20,000 to 150,000, or above, the preferred molecular weight being from 40,000 to 80,000. The polymer may also show an iodine number (as determined by the Wijs method) of from 1 to 40 or 50, the preferred range of iodine number being between 1 and about 10. This material thus is a high grade rubber substitute.

It is found that this material cures readily with curing agents to yield cured materials having tensile strengths ranging from 1,200 to 5,000 pounds per square inch with elongations ranging from 400% to 1200%, very high abrasion and flexure resistance, phenomenally high resistance to chemicals generally and solvents generally, except the petroleum hydrocarbons, and an excellent resistance to ultra violet light and to oxidation.

In preparing this polymer for use, it is conveniently compounded according to the following receipe:

| | Parts by weight |
|---|---|
| Polymer | 100.0 |
| Zinc oxide | 3.0 |
| Stearic acid | 3.0 |
| Thermatomic carbon black | 50.0 |
| Processing oil | 10.0 |
| p-Quinone dioxime | 2.0 |
| $Pb_3O_4$ | 10.0 |

However, when compounded according to this recipe, the material shows a very troublesome scorchiness to the extent that unless the utmost care is exercised and the material kept at the lowest possible temperature during processing, the material may set up into a nearly complete cure on the mill during the compounding.

According to the present invention, this tendency toward premature curing or "scorchiness" is overcome by incorporating into the polymer the scorch preventative agent of the present invention, such as lead benzoate or lead salts of the aromatic acids in general such as lead salicylate, lead phthalate and the like, and other similar salts of other heavy metals such as tin, cadmium, and the like, including those metals low in the electromotive series; particularly those which ionize in water solution to produce a pH below about 7; or the corresponding acids may be used as such.

EXAMPLE 1

A sample of polymer prepared as above described from isobutylene and isoprene containing approximately one molecular percent of isoprene, showing a molecular weight of approximately 45,000 and an iodine number of approximately 1.5 was compounded according to the following recipe:

| | Parts by weight |
|---|---|
| Polymer | 100.0 |
| Zinc oxide | 3.0 |
| Stearic acid | 3.0 |
| Thermatomic carbon black | 50.0 |
| Petroleum oil[1] | 10.0 |

[1] A low viscosity paraffinic pale oil, produced by conventional distillation and acid treatment, having the following specification:

Sp. gr. (60° F.) = 0.881
Flash point = 375° F.
Fire point = 415° F.
Saybolt viscosity (100° F.) = 107
Saybolt viscosity (210° F.) = 39.3

The compound was then separated into two portions. One portion was returned to the mill with the roll temperatures adjusted to 200° F. and the curing agent consisting of

| | Parts by weight |
|---|---|
| Quinone dioxime | 2.0 |
| $Pb_3O_4$ | 10.0 | was milled in. Even at this relatively low temperature the material was visibly "scorched" at the end of ten minutes and the material showed very troublesome signs of pre-curing, or scorchiness, to the extent that it was difficult to mill, difficult to calender, practically impossible to extrude and difficult to force into all the crevices of the mold.

The other portion was then further compounded with

| | Parts by weight |
|---|---|
| Quinone dioxime | 2.0 |
| $Pb_3O_4$ | 10.0 |
| Lead benzoate | 2.0 |

This compound did not scorch on the mill at 200° F. and showed no signs of scorch in twenty minutes' milling, yet it cured readily and normally in the press at 287° F. with no noticeable change in curing properties or any other characteristics over the same compound containing no lead benzoate.

The resulting cured material showed a tensile strength slightly superior to the tensile strength of material containing no lead benzoate; showed approximately the same elongation at break and approximately the same flexure resistance and abrasion resistance. The Mooney plasticity of the material after compounding and before curing was found to be considerably better because of the absence of scorchiness and absence of any tendency towards precuring.

EXAMPLE 2

A series of compounds were prepared according to the recipe shown in the following Table 1, in which the left hand column shows the recipe, the first column of numbers records the results of a control run, and the following six columns show the results of various amounts of various scorchiness preventers according to the present invention. The first nine lines of the table show the compounding recipe, and the lines below show the values for tensile strength, elongation and modulus at 300% of the several compounds after different lengths of time of curing at different temperatures.

It will be observed that these aromatic acids are substantially as good scorchiness preventers as are the lead salts of similar acids.

*Table 1*

|  | Control | I | II | III | IV | V | VI |
|---|---|---|---|---|---|---|---|
| Polymer | 100.0 | 100.0 | 100.0 | 100.0 | 100.0 | 100.0 | 100.0 |
| Zinc Oxide | 5.0 | 5.0 | 5.0 | 5.0 | 5.0 | 5.0 | 5.0 |
| Stearic Acid | 6.0 | 6.0 | 6.0 | 6.0 | 6.0 | 6.0 | 6.0 |
| Carbon Black | 54.0 | 54.0 | 54.0 | 54.0 | 54.0 | 54.0 | 54.0 |
| p-quinone dioxime | 2.0 | 2.0 | 2.0 | 2.0 | 2.0 | 2.0 | 2.0 |
| $Pb_3O_4$ | 10.0 | 10.0 | 10.0 | 10.0 | 10.0 | 10.0 | 10.0 |
| Lead Salicylate |  | 2.0 | 4.0 |  |  |  |  |
| Lead Benzoate |  |  |  | 2.0 | 4.0 |  |  |
| Lead Phthalate |  |  |  |  |  | 2.0 | 4.0 |
| Scorch Cures, Tensile—Elong.—Mod. @ 300: |  |  |  |  |  |  |  |
| Cured 20'/227° F | 1260–650 420 | 710–980 140 | 530–1090 110 | 1330–710 370 | 1220–770 270 | 1320–630 390 | 1280–530 370 |
| Cured 40'/227° F | 1460–640 540 | 1100–840 210 | 1010–890 180 | 1380–640 520 | 1270–690 440 | 1380–640 660 | 1330–590 610 |
| Normal cures: |  |  |  |  |  |  |  |
| Cured 10'/287° F | 1180–480 680 | 1280–590 610 | 1150–570 600 | 1160–550 600 | 1170–560 460 | 1210–530 580 | 1110–480 670 |
| Cured 20'/287° F | 1510–560 730 | 1240–530 670 | 1060–540 620 | 1220–570 570 | 1170–570 550 | 1280–540 640 | 1130–500 620 |
| Cured 40'/287° F | 1060–370 840 | 1240–490 760 | 1070–500 590 | 1170–500 640 | 1060–450 630 | 1220–540 580 | 1190–520 610 |
| Cured 80'/287° F | 1410–630 570 | 1230–560 560 | 1000–510 450 | 1190–600 490 | 1180–600 440 | 1230–560 540 | 1200–510 570 |

It will be noted that when the compound is heated for 20 or 40 minutes at 227° F., which is approximately compounding temperature, on the mill, less curing occurs when the lead salts are present, as shown in columns 2 to 7 inclusive, whereas the material is practically fully cured in the absence of the scorchiness preventers, as shown by column 1. In addition, when the material is cured at 287° F., there is very little difference in the resulting tensile strength, elongation and modulus between the compound of column 1 containing no scorchiness preventers and the compounds of columns 2 to 7 inclusive, which contain the scorchines preventers. It will be evident from the test records shown in Table 1 that these three scorchiness preventers are highly effective for preventing precuring during compounding, and are without effect upon the cured material, cured at normal temperatures and times.

EXAMPLE 3

A similar series of compounds were prepared utilizing for the scorchiness preventer a series of aromatic acids, as shown in the following Table 2. These acids were used in the same way as the lead salts in Table 1, and they perform similar functions, as will be observed from the tensile strength and elongation data recorded in Table 2.

EXAMPLE 4

A similar series of determinations were run with thiosalicylic acid according to the recipe shown in the following Table 3:

*Table 3*

|  | Control | I | II |
|---|---|---|---|
| Polymer | 100.0 | 100.0 | 100.0 |
| Zinc oxide | 5.0 | 5.0 | 5.0 |
| Stearic acid | 3.0 | 3.0 | 3.0 |
| Carbon black | 54.0 | 54.0 | 54.0 |
| p-quinone dioxime | 2.0 | 2.0 | 2.0 |
| $Pb_3O_4$ | 10.0 | 10.0 | 10.0 |
| Thiosalicylic acid |  | 0.5 | 1.0 |
| Scorch cures, tensile—elong.—Mod. @ 300: |  |  |  |
| Cured 20'/227° F | 1250—870 280 | 290—1100+ 80 | 55—1100+ 0 |
| Cured 40'/227° F | 1260—810 350 | 890—770 240 | 480—900 120 |
| Cured 60'/227° F | 1270—780 440 | 830—770 270 | 250—820 130 |
| Cured 10'/287° F | 1260—660 580 | 980—600 470 | 1030—680 350 |
| Cured 20'/287° F | 1300—700 580 | 1200—690 480 | 1120—740 370 |
| Cured 40'/287° F | 1270—680 560 | 1040—660 450 | 1020—720 360 |

It will be observed that thiosalicylic acid likewise is about as effective as a scorchiness preventer as the lead aromatic acid salts.

The above examples show the reaction with

*Table 2*

|  | Control | I | II | III | IV |
|---|---|---|---|---|---|
| Polymer | 100.0 | 100.0 | 100.0 | 100.0 | 100.0 |
| Zinc Oxide | 5.0 | 5.0 | 5.0 | 5.0 | 5.0 |
| Stearic Acid | 3.0 | 3.0 | 3.0 | 3.0 | 3.0 |
| Semi-Reinforcing Furnace Black | 54.0 | 54.0 | 54.0 | 54.0 | 54.0 |
| Quinone Dioxime | 2.0 | 2.0 | 2.0 | 2.0 | 2.0 |
| $Pb_3O_4$ | 10.0 | 10.0 | 10.0 | 10.0 | 10.0 |
| Benzoic Acid |  | 2.0 |  |  |  |
| Salyclic Acid |  |  | 2.0 |  |  |
| o-chlorbenzoic Acid |  |  |  | 2.0 |  |
| p-chlorbenzoic Acid |  |  |  |  | 2.0 |
| Scorch Cures, Tensile—Elong.: |  |  |  |  |  |
| Cured 20'/227°F | 1260—780 | 730—1000 | 0—1100+ | 730—970 | 530—1000 |
| Cured 40'/227°F | 1340—770 | 1070—860 | 310—950 | 1010—830 | 1010—790 |
| Tensile—Mod. @300—Elong.: |  |  |  |  |  |
| Cured 10'/287°F | 1180—450—650 | 980—480—610 | 1100—450—660 | 1040—500—650 | 1210—530—660 |
| Cured 20'/287°F | 1190—430—650 | 980—470—620 | 1070—530—640 | 970—460—630 | 1180—510—620 |
| Cured 40'/287°F | 1160—420—650 | 1100—540—620 | 950—490—630 | 970—430—690 | 1160—490—600 |
| Cured 80'/287°F | 1100—440—580 | 1140—550—660 | 900—510—600 | 1040—400—700 | 1130—450—650 | the low temperature interpolymer of isobutylene with a diolefin; but similar results are obtained with natural rubber and with the diolefin polymers marketed under the name of "Buna," including the simple polymer of butadiene; the copolymer of butadiene with acrylonitrile; and the copolymer of butadiene with styrene.

The exact method of operation and the exact reactions involved are still unknown in detail. However, chemical theory suggests that it is a mass law reaction involving the following reactions. Tests indicate that when the compounded material, especially containing the aromatic esters of paraquinous dioxime is cured at elevated temperatures, the reactions shown in the following Equation 1 may occur:

*Equation 1*

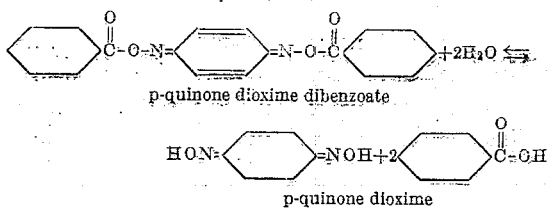

p-quinone dioxime dibenzoate p-quinone dioxime

The paraquinone dioxime resulting from this reaction is the primary curing agent and it appears that the cyclic radical forms a cross-linkage between adjacent molecules of polymer which results in the destruction of the property of cold flow and causes the cure; the double linkage at two points in adjacent polymer molecules being broken and saturated by the curing agent.

This reaction is facilitated and stabilized by the presence of an oxidizing agent such as lead dioxide, $PbO_2$, or other lead compounds such as $Pb_3O_4$. The reaction in this instance is slightly different, as is shown by Equation 2:

*Equation 2*

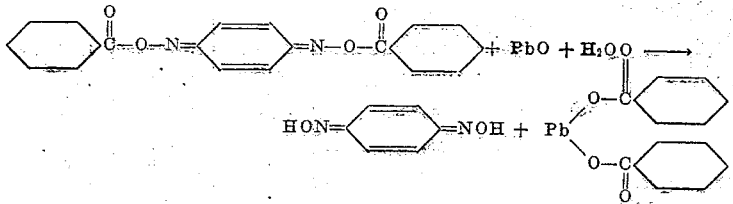

It may be observed that the p-quinone-dioxime is an alcohol and the presence of acid either directly as such, or produced by dissociation, apparently reduces the reactivity of the alcohol, possibly by reducing the solubility, or perhaps by forming salts or esters which remove it from the sphere of reaction.

This reaction of the present invention appears to be applicable to the curing of all types of high molecular weight rubber-like substances including especially natural rubber, and also the several bunas, including both the emulsion polymer and the mass polymer of butadiene; the emulsion polymer of butadiene with acrylonirtile, and the emulsion polymer of butadiene with styrene.

Thus the invention provides a new and highly potent scorchiness preventer which permits of the working, compound, extruding and other milling treatments of rubber-like substances at elevated temperatures in the presence of curing agents without the production of a premature cure and without any tendency toward troublesome scorchiness, by the incorporation into the compound of an aromatic acid or a heavy metal salt of an aromatic acid.

While there are above disclosed but a limited number of embodiment of the product and process of the present invention, it is possible to provide still other embodiments without departing from the inventive concept herein disclosed, and it is therefore desired that only such limitations be imposed upon the appended claims as are stated therein or required by the prior art.

The invention claimed is:

1. A composition of matter comprising a rubbery polymer having polymerized thereinto a major proportion of isobutylene and a minor proportion of a multi-olefin having from 4 to 14 inclusive carbon atoms per molecule in the monomer before polymerization; together with a curing agent, in an amount on the order of magnitude of 2 parts per 100 parts of polymer, comprising a compound having a quinone dioxime nucleus; and a scorchiness preventing agent, in the range between 0.5 part and 4 parts per 100 parts of polymer, comprising a compound having an aromatic acid radical.

2. A composition of matter comprising a rubbery polymer having polymerized thereinto a major proportion of isobutylene and a minor proportion of isoprene; together with a curing agent, in an amount on the order of magnitude of 2 parts per 100 parts of polymer, comprising a compound having a quinone dioxime nucleus; and a scorchiness preventing agent, in the range between 0.5 part and 4 parts per 100 parts of polymer, comprising a compound having an aromatic acid radical.

3. A composition of matter comprising a rubbery polymer having polymerized thereinto isobutylene and a significant amount of a multi-olefin having from 4 to 14 inclusive carbon atoms per molecule in the monomer before polymerization; together with a curing agent, in an amount on the order of magnitude of 2 parts per 100 parts of polymer, comprising a compound having a quinone dioxine nucleus; and a scorchiness preventing agent, in the range of between 0.5 part and 4 parts per 100 parts of polymer, comprising a compound having an aromatic acid.

4. A composition of matter comprising a rubbery polymer having polymerized thereinto isobutylene and a significant amount of a multi-olefin having from 4 to 14 inclusive carbon atoms per molecule in the monomer before polymerization; together with a curing agent, in an amount on the order of magnitude of 2 parts per 100 parts of polymer, comprising a compound having a quinone dioxime nucleus; and a scorchiness preventing agent, in the range between 0.5 part and 4 parts per 100 parts of polymer, comprising a compound having an aromatic acid salt of a heavy metal.

5. A composition of matter comprising a rubbery polymer having polymerized thereinto isobutylene and a significant amount of a multi-olefin having from 4 to 14 inclusive carbon atoms per molecule in the monomer before polymerization; together with a curing agent, in an amount on the order of magnitude of 2 parts per 100 parts of polymer, comprising a compound having a quinone dioxime nucleus; and a scorchiness preventing agent, in the range between 0.5 parts and 4 parts per 100 parts of polymer, comprising a compound having an aromatic acid salt of lead.

6. A composition of matter comprising a rubbery polymer having polymerized thereinto isobutylene and a significant amount of a multi-olefin having from 4 to 14 inclusive carbon atoms per molecule in the monomer before polymerization; together with a curing agent in an amount on the order of magnitude of 2 parts per 100 parts of polymer, comprising a compound having a quinone dioxime nucleus; and a scorchiness preventing agent, in the range between 0.5 part and 4 parts per 100 parts of polymer, comprising a compound having an aromatic acid salt of cadmium.

7. A composition of matter comprising a rubbery polymer having polymerized thereinto isobutylene and a significant amount of a multi-olefin having from 4 to 14 inclusive carbon atoms per molecule in the monomer before polymerization; together with a curing agent, in an amount on the order of magnitude of 2 parts per 100 parts of polymer, comprising a compound having para quinone dioxime; and a scorchiness preventing agent, in the range between 0.5 part and 4 parts per 100 parts of polymer, comprising a compound having an aromatic acid salt of lead.

8. A composition of matter comprising a rubbery polymer having polymerized thereinto isobutylene and a significant amount of a multi-olefin having from 4 to 14 inclusive carbon atoms per molecule in the monomer before polymerization; together with a curing agent in an amount on the order of magnitude of 2 parts per 100 parts of polymer, comprising a compound having para quinone dioxime; and a scorchiness preventing agent, in the range between 0.5 part and 4 parts per 100 parts of polymer, comprising a compound having an aromatic acid salt of cadmium.

9. In the processing of a rubbery polymer, the steps in combination of milling into the polymer from 0.5 part to 4 parts per 100 parts of polymer of a scorchiness preventing agent comprising a compound having an aromatic acid nucleus; and an amount on the order of magnitude of two parts per 100 parts of elastomer of a curing agent comprising a compound having a quinone dioxime nucleus.

10. In the processing of a rubbery polymer, the steps in combination of milling into the polymer from 0.5 part to 4 parts per 100 parts of polymer of a scorchiness preventing agent comprising a compound having an aromatic acid nucleus; and an amount on the order of magnitude of two parts per 100 parts of elastomer of a curing agent comprising a compound having a quinone dioxime nucleus, and thereafter heating the mixture to a curing temperature of the order of magnitude of 287° F.

11. In the processing of a rubbery polymer, comprising a polymer having polymerized thereinto a significant amount of a multi-olefin having from 4 to 14 inclusive carbon atoms per molecule in the monomer before polymerization, the steps in combination of milling into the elastomer from 0.5 part to 4 parts per 100 parts of elastomer of a scorchiness preventing agent comprising a compound having an aromatic acid nucleus; and an amount on the order of magnitude of two parts per 100 parts of elastomer of a curing agent comprising a compound having a quinone dioxime nucleus.

12. In the processing of a rubbery polymer, comprising a polymer having polymerized thereinto a significant amount of a multi-olefin having from 4 to 14 inclusive carbon atoms per molecule in the monomer before polymerization, the steps in combination of milling into the elastomer from 0.5 part to 4 parts per 100 parts of elastomer of a scorchiness preventing agent comprising a compound having an aromatic acid nucleus; and an amount on the order of magnitude of two parts per 100 parts of elastomer of a curing agent comprising a compound having a quinone dioxime nucleus, and thereafter heating the mixture to a curing temperature of the order of magnitude of 287° F.

13. In the processing of a rubbery polymer, comprising a copolymer of a major proportion of isobutylene with a minor proportion of a multi-olefin having from 4 to 14 carbon atoms per molecule, the steps in combination of milling into the elastomer from 0.5 part to 4 parts per 100 parts of elastomer of a scorchiness preventing agent comprising a compound having an aromatic acid nucleus; and an amount on the order of magnitude of two parts per 100 parts of elastomer of a curing agent comprising a compound having a quinone dioxime nucleus.

14. In the processing of a rubbery polymer, comprising a copolymer of a major proportion of isobutylene with a minor proportion of a multi-olefine having from 4 to 14 carbon atoms per molecule, the steps in combination of milling into the elastomer from 0.5 part to 4 parts per 100 parts of elastomer of a scorchiness preventing agent comprising a compound having an aromatic acid nucleus; and an amount on the order of magnitude of two parts per 100 parts of elastomer of a curing agent comprising a compound having a quinone dioxime nucleus, and thereafter heating the mixture to a curing temperature of the order of magnitude of 287° F.

15. In the processing of a rubbery polymer, comprising a copolymer of a major proportion of isobutylene with a minor proportion of isoprene, the steps in combination of milling into the elastomer from 0.5 part to 4 parts per 100 parts of elastomer of a scorchiness preventing agent comprising a compound having an aromatic acid nucleus; and an amount on the order of magnitude of two parts per 100 parts of elastomer of a curing agent comprising a compound having a quinone dioxime nucleus.

16. A composition of matter comprising a polymer having polymerized thereinto approximately 97.5 parts of isobutylene and approximately 2.5 parts of isoprene, together with a curing agent comprising paraquinone dioxime in the proportion of approximately 2 parts by weight per hundred of polymer and 2 parts by weight of lead peroxide, and a scorchiness-preventing agent comprising lead benzoate in the proportion between 0.5 part and 4 parts per hundred parts of polymer.

FRANCIS P. BALDWIN.

REFERENCES CITED

The following references are of record in the file of this patent:

UNITED STATES PATENTS

| Number | Name | Date |
|---|---|---|
| 2,170,191 | Fisher | Aug. 22, 1939 |
| 2,311,004 | Thomas | Feb. 16, 1943 |
| 2,395,778 | Breck | Feb. 26, 1946 |

FOREIGN PATENTS

| Number | Country | Date |
|---|---|---|
| 389,139 | Great Britain | Mar. 13, 1933 |